United States Patent
Polzik et al.

(10) Patent No.: US 9,660,721 B2
(45) Date of Patent: May 23, 2017

(54) OPTICAL DETECTOR AND AMPLIFIER FOR RF-DETECTION HAVING A POSITION DEPENDENT CAPACITOR WITH A DISPLACEABLE MEMBRANE

(71) Applicant: Kobenhavns Universitet, Copenhagen K (DK)

(72) Inventors: Eugene Simon Polzik, Copenhagen O (DK); Albert Schliesser, Copenhagen K (DK); Silvan Schmid, Copenhagen O (DK); Anders Sondberg Sorensen, Rodovre (DK); Jacob M. Taylor, Washington, DC (US); Koji Usami, Nakahara-ku (JP); Tolga Bagci, Ankara (TR); Anders Simonsen, Copenhagen NV (DK); Luis Guillermo Villanueva, Neuchatel (CH); Emil Zeuthen, Copenhagen N (DK); Juergen Appel, Soberg (DK)

(73) Assignees: Kobenhavns Universitet, Copenhagen K (DK); Danmarks Tekniske Universitet, Kongens Lyngby (DK); National Institute of Standards and Technology, The United States Of America, as Represented by The Secretary Of Commerce, Washington, DC (US)

( * ) Notice: Subject to any disclaimer, the term of this patent is extended or adjusted under 35 U.S.C. 154(b) by 460 days.

(21) Appl. No.: 14/328,871

(22) Filed: Jul. 11, 2014

(65) Prior Publication Data

US 2016/0011044 A1    Jan. 14, 2016

(51) Int. Cl.
*H04B 10/00* (2013.01)

(52) U.S. Cl.
CPC ....... *H04B 10/00* (2013.01); *H04B 2210/006* (2013.01)

(58) Field of Classification Search
CPC .... H04B 10/00; H04B 2210/006; H01G 7/06; H04W 72/0453; H04W 72/12; H01J 37/3247
(Continued)

(56) References Cited

U.S. PATENT DOCUMENTS 8,467,169 B2 *  6/2013  Oakes ............... H01G 7/06
                                                      361/277

OTHER PUBLICATIONS

T. Bagci, et al., "Optical detection of radio waves through a nanomechanical transducer", Nature, Mar. 2014, pp. 81-85, vol. 507, No. 6.
(Continued)

Primary Examiner — Que T Le
(74) Attorney, Agent, or Firm — Sughrue Mion, PLLC (57) ABSTRACT

An optical detector for detecting radio frequency (RF) signals, the optical detector comprising a light source and a photodetector, and an electrical circuit comprising a position dependent capacitor and a bias voltage source adapted for providing a bias voltage for biasing the position dependent capacitor, the position dependent capacitor comprising an electrode and a membrane being displaceable in reaction to RF signals incident on the membrane, the membrane being metallized, has a thickness of less than 1 μm and a quality factor, $Q_m$, of at least 20,000, and the distance between the membrane and the electrode being less than 10 μm.

20 Claims, 5 Drawing Sheets

(58) Field of Classification Search
USPC .......................................... 250/214 R, 214.1
See application file for complete search history.

(56) References Cited

OTHER PUBLICATIONS

T. Bagci, et al., "Optical detection of radio waves through a nanomechanical transducer" manuscript stamped "arXiv:1307.3467v2[physics.optic] Aug. 2, 2013", Nature, Jul. 12, 2013, pp. 1-20.
Elizabeth Gibney, "Sensor turns faintest radio waves into laser signals" Nature News, http://www.nature.com/news/sensor-turns-faintest-radio-waves-into-laser-signals-1.14823#/b1, Nature News, Mar. 5, 2014, pp. 1-2.
Katia Moskvitch, "Tiny membrane converts radio waves to light", www.physicsworld.com, http://physicsworld.com/cws/article/news/2014/mar/05/tiny-membrane-converts-radio-waves-to-light, Mar. 5, 2014, pp. 1-5.
R. W. Andrews, et al., "Bidirectional and efficient conversion between microwave and optical light", Nature Physics, Apr. 10, 2014, vol. 10, pp. 321-326.
Joerg Bochmann, et al., "Nanomechanical coupling between microwave and optical photons", Nature Physics, Nov. 9, 2013, pp. 712-716, vol. 9.
T. Bagci, et al., "Optical Readout of Coupling Between a Nanomembrane and an LC Circuit at Room Temperature", IEEE, 2013, 1 page.
J. M. Taylor, et al., "Laser Cooling and Optical Detection of Excitations in a LC Electrical Circuit", Physical Review Letters, Dec. 30, 2011, vol. 107, No. 273601.

\* cited by examiner

OPTICAL DETECTOR AND AMPLIFIER FOR RF-DETECTION HAVING A POSITION DEPENDENT CAPACITOR WITH A DISPLACEABLE MEMBRANE

BACKGROUND OF THE INVENTION

The present invention relates to an optical detector and amplifier for detecting radio frequency (RF) and microwave signals, in the following also denoted "optical detector for detecting RF signals", and particularly for detecting weak RF and microwave signals. In this connection weak RF and microwave signal is intended to mean RF and microwave signals having a root mean squared amplitude, $V_s$, in the μV-range or smaller.

It is noted that as used herein the term "metalize" is intended to be understood in its broadest sense, i.e. in the sense of making an object metallic in form or appearance, irrespective of in which way this is obtained.

The article "Optical detection of radio waves through a nanomechanical detector" published in Nature, Vol. 507, 6 Mar. 2014, by the inventors describes such an optical detector for detecting RF signals, and the corresponding manuscript with the same authors and preceding this article provides further information regarding the theory behind such a device, these two documents hereby being incorporated herein by reference in their entirety.

Optical detectors for detecting radio frequency signals provide a conversion interface between wireless communication and optical communication. RF to optical conversion can be advantageous if the radio frequency signals are to be transferred over long distances, as light can be transported in fibres with much lower loss than radio frequency signals in cables. Furthermore, since optical signals can be detected with quantum limited sensitivity, the converter also provides a means for low noise, high sensitivity and low power consuming detection of radio frequency signals after their conversion.

The article "Bidirectional and efficient conversion between microwave and optical light" by R. W. Andrews et al. and published in Nature Physics, Vol. 10, April 2014, describes an optical detector for detecting radio frequency, and particularly microwave, radiation which comprises an LC-circuit with a position dependent capacitor, and which is operated at cryogenic temperatures of 4 K or lower.

However, the prior art optical detectors for detecting radio frequency signals have the drawback that they require cryogenic cooling to temperatures as low as a few K, or in other words cooling with, e.g., liquid helium. Such cryogenic cooling is very expensive, and the prior art optical detectors are therefore very costly both to acquire and to use.

BRIEF SUMMARY OF THE INVENTION

It is therefore the object of the invention to provide an optical detector and amplifier for detecting radio frequency (RF) and microwave signals which may be operated at room-temperature and thereby without the need for cryogenic cooling, and which is therefore considerably cheaper to acquire and considerably more cost efficient in use.

According to the invention, this is obtained by means of an optical detector and amplifier for detecting radio frequency (RF) and microwave signals, the optical detector comprising a light source and a photodetector, an electrical circuit comprising a position dependent capacitor, and a bias voltage source adapted for providing a bias voltage for biasing the position dependent capacitor, the position dependent capacitor comprising an electrode and a membrane, and the membrane being adapted for being displaced in reaction to RF signals applied to the membrane, the light source being adapted for, in operation, emitting light onto the membrane and the photodetector being adapted for, in operation, receiving light emitted by the light source and reflected by the membrane, the membrane being metallized, comprising a thickness of less than 1 μm, and comprising a quality factor, $Q_m$, of at least 20,000, and the distance, d, between the membrane and the electrode being less than 10 μm.

By providing such an optical detector for detecting RF signals, and particularly by providing a membrane being metallized, comprising a thickness of less than 1 μm, and comprising a quality factor, $Q_m$, of at least 20,000, and the distance, d, between the membrane and the electrode being less than 10 μm, the position dependent capacitor is chosen such that the detector has a high cooperativity parameter, C, particularly such that the cooperativity parameter is larger than 100, while no longer necessitating the use of superconductors.

This in turn provides for suppression of the thermal noise induced by the position dependent capacitor, thus allowing for low noise operation of the detector even at relatively high temperatures. Thereby it becomes possible to operate the detector at room temperature as it does not use any cryogenic components, while still converting radio frequency signals into optical signals with extremely high efficiency and low added noise.

Furthermore such an optical detector for detecting radio frequency signals can be easily tuned from being an extremely low voltage light modulator to an extremely low noise amplifier.

Also, as the cooperativity parameter, C, is proportional to the bias voltage squared, the bias voltage source provides for easy adjustment of the cooperativity parameter by tuning the bias voltage.

In an embodiment the distance, d, between the membrane and the electrode is less than 5 μm, less than 3 μm or less than 1 μm.

Generally, the smaller the distance, d, the larger the cooperativity becomes for a given bias voltage, and the more sensitive and less power consuming the detector becomes.

In an embodiment the membrane comprises a thickness of less than 500 nm, less than 100 nm or less than 50 nm.

Generally, the thinner the membrane is, the more flexible it becomes, and the more sensitive the detector becomes. It is noted that thicknesses down to at least 30 nm are feasible.

In an embodiment the membrane comprises a quality factor, $Q_m$, of at least 20,000, at least 100,000 or at least 300,000.

Generally, the larger the quality factor of the membrane is, the more sensitive the detector is.

In an embodiment the electrical circuit further comprises a tuning capacitor connected in parallel with the position dependent capacitor and adapted for tuning the capacitance of the position dependent capacitor.

Thereby a detector is provided with which the capacitance of the position dependent capacitor may be tuned in a simple and straight-forward manner.

In an embodiment the bias voltage source is a DC voltage source.

In a further embodiment the DC voltage source is adapted for providing a DC voltage for biasing the position dependent capacitor.

In an embodiment the bias voltage source is a DC voltage source and the membrane is adapted for comprising a membrane frequency, $\Omega_m$, being less than 50 MHz.

Thereby a detector is obtained which is particularly advantageous for measuring RF signals having a frequency within a bandwidth centred at the resonance frequency of the membrane of the position dependent capacitor.

In another embodiment the bias voltage source is an AC voltage source adapted for providing an AC voltage oscillating at a frequency of between 1 MHz and 3 GHz.

Thereby a detector is obtained with which the membrane of the position dependent capacitor is biased to oscillate at a frequency of between 1 and 50 MHz, which in turn makes it possible to measure radio frequency signals having a frequency corresponding to the sum or the difference of the bias voltage frequency and the membrane frequency and thus having very high frequencies.

In alternative, yet similar, embodiments the AC voltage source is adapted for providing an AC voltage oscillating at a frequency between 10 kHz and 5 GHz or between 10 Hz and 10 GHz.

In an embodiment the electric circuit further comprises an inductor.

Such an inductor works as an external input antenna improving the RF or microwave signal reception of the detector.

Also, in embodiments comprising both an inductor and a tuning capacitor, a detector is provided with which the electrical resonance frequency of the membrane of the position dependent capacitor may be tuned in a simple and straight-forward manner.

In an embodiment the inductor is a superconducting inductor.

Thereby a detector is obtained with which the noise contribution (Johnson noise) from the inductor is reduced by a factor 10 or possibly even more.

In an embodiment the electrode comprises a plurality of segments.

In an embodiment the electrode is made of gold.

Thereby a detector is obtained in which the electrode of the position dependent detector may be provided in a particularly simple and efficient manner. Furthermore, gold has turned out to be particularly suitable for the purpose, as this metal is an excellent conductor and simultaneously resistant to both chemical and physical influences. Alternative suitable electrode materials include, but are not limited to, silver, copper, aluminium, or a highly doped semiconductor.

In an embodiment the membrane is metallized in that it comprises a metallic layer or coating extending over at least a part of its surface.

In a further embodiment the metallic layer or coating is an aluminum-layer or aluminum-coating.

In an embodiment the membrane is metallized in that it comprises a doped, in some embodiments strongly or heavily doped, semiconductor.

Thereby a detector is obtained in which the membrane of the position dependent detector is metallized in a particularly simple, efficient and durable manner. Furthermore, aluminium has turned out to be particularly suitable for the purpose, as this metal is cheap, light, a good reflector with the view of reflecting the incident light from the light source towards the photodetector and furthermore particularly flexible yet resistant to damage inflicted by the vibrations of the membrane. Alternative suitable coating materials include, but are not limited to, silver, gold or niobium.

In an embodiment the detector further comprises an optical resonator comprising a first reflector and a second reflector arranged on opposite sides of the position dependent capacitor.

Thereby a detector is obtained with which the noise contribution from the light emitted by the light source is reduced considerably In an embodiment the bias voltage source is operated to provide a bias voltage of less than 100 mV, less than 1 V or less than 100 V.

The above and other objects are in a second aspect of the invention also obtained by means of a position dependent capacitor for an optical detector and amplifier for detecting radio frequency (RF) or microwave signals, the position dependent capacitor comprising an electrode and a membrane, the membrane being adapted for being displaced in reaction to a RF signal or a microwave signal applied to the membrane, the membrane being metallized, comprising a thickness of less than 1 µm, and comprising a quality factor, $Q_m$, of at least 100,000, and the distance, d, between the membrane and the electrode being less than 10 µm.

In an embodiment the distance, d, between the membrane and the electrode is less than 5 µm, less than 3 µm or less than 1 µm.

In an embodiment the membrane comprises a thickness of less than 500 nm, less than 100 nm or less than 50 nm.

In an embodiment the membrane comprises a quality factor, $Q_m$, of at least 20,000, at least 100,000 or at least 300,000.

In an embodiment the electrode comprises a plurality of segments.

In an embodiment the electrode is made of gold.

In an embodiment the membrane is metallized in that it comprises a metallic coating extending over at least a part of its surface In an embodiment the membrane is metallized in that it comprises a doped, in some embodiments strongly or heavily doped, semiconductor.

In an embodiment the metallic coating is an aluminum-coating.

The optical detector for detecting RF signals according to the invention can be used in applications where sensitive radio signal detection is of the essence, such as mobile communication, quantum communication, medical imaging, navigation, RF magnetic field imaging and radio astronomy.

In particular, the optical detector for detecting RF signals according to the invention will benefit applications where the noise of the antenna, i.e. the inductor, is low. Such applications include magnetic resonance imaging and other devices with high-Q coils and detection of cosmic signals with a low radiative temperature.

BRIEF DESCRIPTION OF THE SEVERAL VIEWS OF THE DRAWING

Examples of the invention will now be explained below with reference to the very schematical drawings, in which:

FIGS. 2 to 5 show different graphs illustrating measurements performed on an exemplary specific detector according to the invention and the setup shown in FIGS. 1A to 1C. More specifically:

FIG. 3 shows the response of the detector to a weak excitation at frequency Ω (through coupling port 31 in FIG. 1A) probed through the voltage modulation in the LC circuit (at coupling port 81) (graph a) and through the optical phase shift (graph b). The data (shown as dots) measured for five different bias voltages agree excellently with model fits (curves) respectively corresponding to a coupling energy divided by Planck's constant, $g_{em}/2\pi$, of 280, 470, 810, 1030 and 1290 Hz (from bottom to top). Each curve is offset so that its baseline corresponds to the bias voltage, $V_{dc}$, indicated between the panels. Grey points indicate $\Omega_m$ values extracted for each set of data. A shift of $\Delta\Omega_m \propto -V_{dc}^2$ is fitted with the dashed line. The inset illustrates the effective line width of the mechanical resonance extracted from full model fits to the electrically (circles) and optically (boxes) measured response and simple Lorentzian fits to the optical data (diamonds). The solid line shows the expected scaling of the mechanical dissipation, $\Gamma_{eff} \propto V_{dc}^2$.

FIG. 4 illustrates the strong coupling regime of the detector. Graph a shows the measured coherent coupling rate, $2g_{em}/2\pi$, as a function of bias voltage (points), and linear fit (line). The shaded area indicates the dissipation rate, $\Gamma_{LC}/2\pi \approx 5.9$ kHz of the LC circuit. Graphs b to e show the normalized response of the coupled system as measured on coupling port 81 in FIG. 1A (panel b and graph d) and via the optical phase shift induced by membrane displacements (panel c and graph e). The gray tone scales encode normalized voltage (panel b) and displacement modulation (panel c). On tuning of the bias voltage, the mechanical resonance frequency is tuned through the LC resonance, but owing to the strong coupling an avoided crossing is very clearly observed. Graphs d and e show the spectra corresponding to the horizontal lines in panels b and c, respectively, at $V_{dc}=242$ V, where the electronic and mechanical resonance frequencies coincide. Points are data; the line is the model fit.

FIG. 5 shows the voltage sensitivity and noise of the detector. Noise characterization of the transducer with contributions from Johnson noise is denoted 14, optical quantum phase noise is denoted 15 and membrane thermal noise is denoted 16. Graph a illustrates that the optically measured noise (denoted 13) is well reproduced by a model described below (denoted 17 in graph c). Graph b illustrates data and models as in graph a, but divided by the interface's response function, $|\chi^{tot}|$, and thus referenced to the voltage, $V_s$, induced in the circuit. Graph c illustrates the noise temperature of the amplifier (errors, s.d.). The noise temperature is determined using the Y-factor method, at the resonance frequency (points denoted 18), and in a 10-kHz-wide band around the resonance (points denoted 13), as a function of external loading. Lines are the model of equation (10), broken down into contributions as in graphs a and b. The inset illustrates an example of a noise temperature measurement at $R_s=1,250\Omega$.

DETAILED DESCRIPTION OF THE INVENTION

Figures 1A, 1B, 1C:
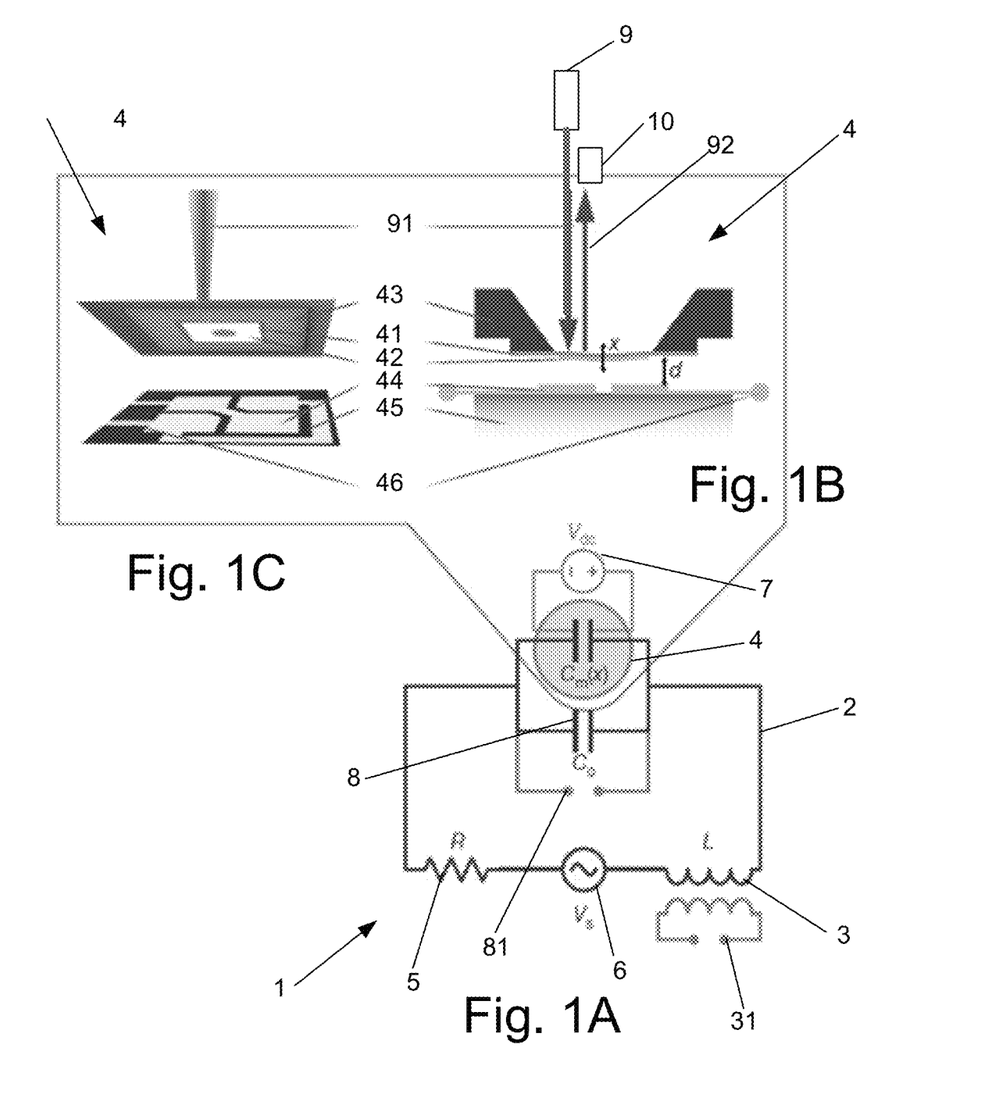
FIG. 1A depicts a circuit diagram illustrating a first embodiment of a detector and amplifier for detecting radio frequency (RF) or microwave signals according to the invention which i.a. comprises a position dependent capacitor with a membrane and an electrode.
FIGS. 1B and 1C depicts a cross sectional view and a perspective view, respectively, of the position dependent capacitor of the detector according to FIG. 1A.

With reference now to FIGS. 1A, 1B and 1C a first embodiment of an optical detector and amplifier 1 for detecting radio frequency (RF) and microwave signals according to the invention will be described.

Generally, and with reference to FIG. 1A, the optical detector 1 comprises a light source 9, a photodetector 10 and an electrical circuit 2 in the form of a so-called LC-circuit or RF-resonator.

The electrical circuit 2 comprises an optional inductor 3, a position dependent capacitor 4, an optional tuning capacitor 8 connected in parallel with the position dependent capacitor 4 and a bias voltage source 7.

The tuning capacitor 8, which is optional and which has a capacitance denoted $C_0$, is adapted for tuning the capacitance of the position dependent capacitor 4. The tuning capacitor 8 and the position dependent capacitor 4 are therefore coupled in parallel. The tuning capacitor 8 may furthermore comprise a coupling port 81, the use of which will be apparent from the example given further below.

The voltage source denoted 6 is indicating the voltage, $V_s$, stemming from the RF signal or microwave signal to be detected. The voltage, $V_s$, may be injected through a coupling port 31 of the inductor 3.

The bias voltage source 7 is adapted for providing a bias voltage, V, for biasing the position dependent capacitor 4. The bias voltage source 7 is therefore connected directly to the position dependent capacitor 4.

The bias voltage provided by the bias voltage source 7 may be a direct current (DC) voltage. In this case the membrane frequency, $\Omega_m$, is chosen to match the frequency, $\Omega_{RF}$, of the signals to be detected. In one specific embodiment the membrane frequency, $\Omega_m$, is chosen to be less than 50 MHz.

Alternatively, the bias voltage provided by the bias voltage source 7 may be an alternating current (AC) voltage which may be chosen to oscillate at a specific frequency, and which in one specific embodiment may be chosen to oscillating at a frequency of between 1 MHz and 3 GHz.

The inductor 3, which is optional and which has an inductance denoted L, functions as an external input antenna for receiving the RF signal or microwave signal to be detected. The inductor 3 may in one embodiment be an ordinarily conducting inductor, i.e. an inductor conducting at room temperature. In another embodiment the inductor 3 may be a superconducting inductor, which specifically is obtained by cryogenically cooling the inductor 3. The inductor 3 is not limited to comprising any specific number of windings, but may rather comprise any suitable number of windings. The inductor 3 may furthermore comprise a coupling port 31, the use of which will be apparent from the example given further below.

In embodiments with no tuning capacitor 8 but comprising an inductor 3, the impedance of the circuit 2, including the position dependent capacitor 4 may be tuned by means of the inductor. In embodiments with no tuning capacitor 8 and no inductor 3, the impedance of the circuit 2, including the position dependent capacitor 4 may be tuned by adapting the geometry of the position dependent capacitor.

The light source 9 may be any suitable light source, and is in one particular embodiment a laser emitting at a suitable wavelength, λ, such as 633 nm as in the example below.

The photodetector 10 may likewise be any suitable photodetector having a sufficiently high sensitivity, and being adapted to measure the amplitude and/or the phase of the light 92 reflected from the membrane. Particularly, light noise may be quantum (shot) noise limited by means of a carefully designed photodetector 10.

In many embodiments, the physical inductor 3, which may be a coil, a surface-mounted element, or the like, will intrinsically provide both an inductance L, and a resistance R. In such an embodiment the resistor denoted 5 on FIG. 1A illustrates this resistance plus the inherent resistance of the circuit. In other embodiments the resistor 5 simply illustrates the inherent resistance of the circuit.

In the circuit 2 according to the invention and shown in FIG. 1A, the inductor 3 forms an antenna while the position dependent capacitor 4 and the bias voltage source 7 together form a transducer converting an ambient RF signal into vibrations of the membrane, which may in turn be converted to an optical signal by means of the light 91 emitted by the light source 9.

Thereby is provided an electro-optomechanical transducer with which a weak input RF signal or microwave signal in the frequency range 100 kHz to 10 GHz may be detected. In this connection the position dependent capacitor 4 is arranged such that a displacement of a part of the position dependent capacitor 4 is proportional to the amplitude of a RF signal voltage, $V_s$, picked up by the inductor 3 and/or injected through the coupling port 31. A bias voltage provided by the bias voltage source 7 is applied to the position dependent capacitor 4 in addition to the signal voltage. The induced displacements are detected by optical interferometry.

The noise of the optical detector 1 consists of the thermal or mechanical noise, $\alpha_1/C$, of the position dependent capacitor 4 and the optical detection noise, $\alpha_2 C$, where C is the cooperativity parameter and $\alpha_1$ and $\alpha_2$ are proportionality constants. Under the condition of strong electro-mechanical coupling (or in other words a high cooperativity parameter) the noise added by the transducer has a temperature that is far (>10 times) below the temperature at which the optical detector 1 is operated. This is realised by balancing the individual noise contributions through an appropriately chosen coupling strength (cooperativity parameter) between input signals and capacitor displacements via tuning the bias voltage and optical power. The cooperativity parameter is defined as the ratio of the mechanical resonance with and without the electro-mechanical coupling. The optical detection noise may be reduced by employing an optical resonator (cf. the embodiment shown in FIG. 7) or by using shot noise or quantum noise limited light.

Generally, the position dependent capacitor 4 as described in claim 1 is chosen such that this transducer has a high cooperativity parameter, C, particularly such that the cooperativity parameter is larger than 1000. The cooperativity parameter, C, is proportional to the bias voltage squared and can be easily adjusted by tuning the bias voltage.

An embodiment of the position dependent capacitor 4 is shown in more detail in FIGS. 1B and 1C. As shown, the position dependent capacitor 4 comprises an electrode 44 and a membrane 41 and has a capacitance denoted $C_m(x)$, where x is the displacement of the membrane 41 to be explained further below. Reference numeral 46 denotes the electrical connections connecting the position dependent capacitor 4 to the remaining part of the circuit 2. The membrane 41 is arranged on a holder, substrate or base 43. The base 43 is in the embodiment shown is a silicon-wafer, but it may also take other suitable forms or be made in other suitable materials.

The membrane 41 is adapted for being displaced in reaction to RF signals coupled to the electric circuit 2 to which the membrane in connected.

The light source 9 is adapted for, in operation, emitting light 91 onto the membrane 41. The light 91 incident on the membrane 41 is reflected by the membrane 41 and the oscillations or vibrations induced in the membrane 41 by the RF signals are thereby modulated onto the outgoing light 92. The photodetector 10 is adapted for, in operation, receiving light emitted by the light source 9 and reflected by the membrane 41, i.e. for receiving the outgoing light 92 and thereby detecting the RF signals.

Furthermore, the membrane 41 is metallized. In one embodiment the membrane 41 is metallized in that it comprises a metallic coating 42, such as a coating of aluminum. In another embodiment the membrane 41 is metallized in that it comprises a doped semiconductor. The membrane 41 comprises a thickness of less than 1 μm, and a quality factor, $Q_m$, of at least 100,000.

Also, the distance, d, between the membrane 41 and the electrode 44 is less than 10 μm.

The electrode 44 comprises in the embodiment shown four segments and is made of gold. In other embodiments the electrode may comprise another number of segments, such as less than four or more than four, and/or it may be made of another metal than gold or of a doped semiconductor. The electrode 44 is arranged on a substrate 45, which in the embodiment shown is made of glass.

Figure 6:
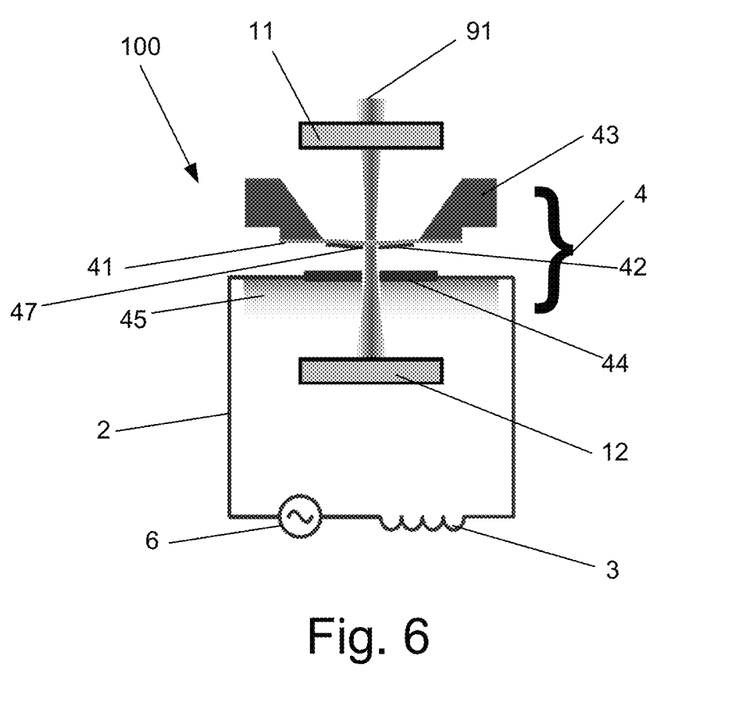
FIG. 6 depicts a cross sectional and schematic view of a second embodiment of a detector according to the invention which i.a. comprises a position dependent capacitor and an optical resonator.
Figure 7:
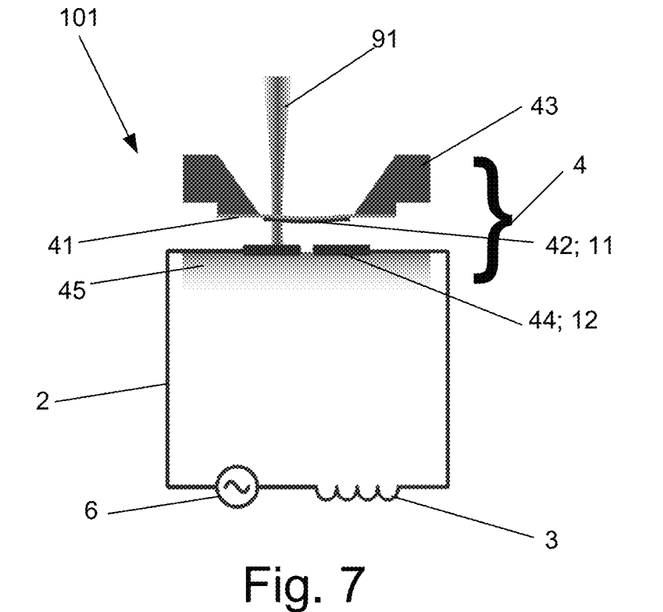
FIG. 7 depicts a cross sectional and schematic view of a third embodiment of a detector according to the invention which i.a. comprises a position dependent capacitor and an optical resonator.

Further exemplary embodiments of a detector for detecting RF signals according to the invention are shown in FIGS. 6 and 7, and will be described below with reference to the respective differences compared with the detector 1 for detecting RF signals according to FIGS. 1A to 1C.

Turning first to FIG. 6 a further embodiment of a detector 100 for detecting RF signals according to the invention is shown in a simplified illustration. The detector 100 differs from that shown in FIG. 1A to 1C in that the circuit 2 has no resistor 5. Furthermore the light source, detector and bias voltage source are not shown for simplicity.

The detector 100 differs from that shown in FIG. 1A to 1C in two further points. Firstly, the detector 100 further comprises an optical resonator formed by a first reflector 11 and a second reflector 12 arranged on opposite sides of the position dependent capacitor 4. Secondly, an opening 47 or a hole is provided in the metallic coating 42 of the membrane 41.

The first reflector 11 and the second reflector 12 form an optical resonator into which light 91 is induced through the first reflector 11, and is reflected back and forth between the first reflector 11 and the second reflector 12, on the way propagating through the membrane 41, the opening 47 in the metallic coating 42 on the membrane 41, the electrode 44—for instance through the spacing between the electrode segments—and the substrate 45.

Turning now to FIG. 7 a further embodiment of a detector 101 for detecting RF signals according to the invention is shown. It is noted that the light source, detector and bias voltage source are not shown for simplicity.

The detector 101 is very similar to the detector 100 shown in FIG. 6 and differs from the detector 100 shown in FIG. 6 in only one point.

Namely, the detector 101 further comprises an optical resonator provided in that, in addition to their above-mentioned electric functionalities, the metallic coating 42 of the membrane 41 functions as a first reflector 11, and the electrode 44 or electrode segments function as a second reflector 12. The first reflector 11 and the second reflector 12 are thus arranged on opposite sides of the position dependent capacitor 4. In more general terms, such an optical resonator can be said to be an integrated optical resonator.

This embodiment thus enables a particularly compact integration of the optical resonator in the detector, and thereby a particularly compact detector.

Example

In the following an example will be described with reference to an experiment performed on a specific optical detector for detecting RF signals according to the invention of the type described above in relation to FIGS. 1A to 1C. The experimental results are illustrated in FIGS. 2 to 5.

In the specific setup used, the position dependent capacitor was provided with a 500 µm² membrane of Al-coated SiN in vacuum ($10^{-5}$ mbar) and a planar, four-segment gold electrode in the immediate vicinity (0.9 µm≤d≤6 µm), and had a capacitance at zero displacement of the membrane of $C_m(x=0) \approx 0.5$ pF. The membrane electrode's potential is electrically floating.

The membrane's displacement, x, is converted into a phase shift of the laser beam reflected from the membrane. The position dependent capacitor is, as mentioned, part of an LC circuit, and is tuned to the mechanical resonance frequency by means of a tuning capacitor with a capacitance $C_0 \approx 80$ pF. A bias voltage, $V_{dc}$, couples the excitations of the LC circuit to the membrane's motion. The circuit is driven by a voltage, $V_s$, which can be injected through the coupling port 31 or picked up by the inductor 3 from the ambient radio frequency radiation.

The membrane used is a nanomembrane with a quality factor $Q_m \approx 3*10^5$. Together with the four-segment gold electrode, the membrane forms a position dependent capacitor, whose capacitance, $C_m(x)$, depends on the effective membrane-electrode distance, d+x, where x is the deflection of the membrane induced by the incident RF signal. With a tuning capacitor having a capacitance $C_0$, the total capacitance, $C(x)=C_0+C_m(x)$, forms a resonance circuit with a typical quality factor $$Q_{LC} = \frac{\sqrt{L/C}}{R} = 130 \tag{1}$$

using a custom-made coil wired on a low-loss ferrite rod as the inductor 3. This yields an inductance L=0.64 mH and a loss R≈20 V. The circuit's resonance frequency $$\Omega_{LC} = 1/\sqrt{LC} \tag{2}$$

is tuned to the frequency, $\Omega_m/2\pi$=0.72 MHz, of the fundamental drum mode of the membrane. The membrane-circuit system is coupled to a propagating optical mode in that a light source provides a light beam which is reflected from the membrane and detected by a photodetector. The electromechanical dynamics is described most generically by the Hamiltonian:

$$H = \frac{\phi^2}{2L} + \frac{p^2}{2m} + \frac{m\Omega_m^2 x^2}{2} + \frac{q^2}{2C(x)} - qV_{dc} \tag{3}$$

where ϕ and q, respectively, which are the flux in the inductor 3 and the charge on the capacitors 4 and 8, respectively, are conjugate variables for the LC circuit, and x and p respectively denote the position and momentum of the membrane 41, which has an effective mass m. The last two terms of equation (3) represent the charging energy, $U_C(x)$, of the capacitors 4 and 8, which can be offset using an externally applied bias voltage, which in this example is a DC voltage, $V_{dc}$. This energy, corresponding to the charge $\bar{q}=V_{dc}C(\bar{x})$, leads to a new equilibrium position, $\bar{x}$, for the membrane. Furthermore, the position-dependent capacitive force, $F_C(x)=dU_C/dx$, causes spring softening, reducing the membrane's motional eigenfrequency by $$\Delta\Omega_m \approx C''(\bar{x})V_{dc}^2/2m\Omega_m \tag{4}$$

Figure 2:
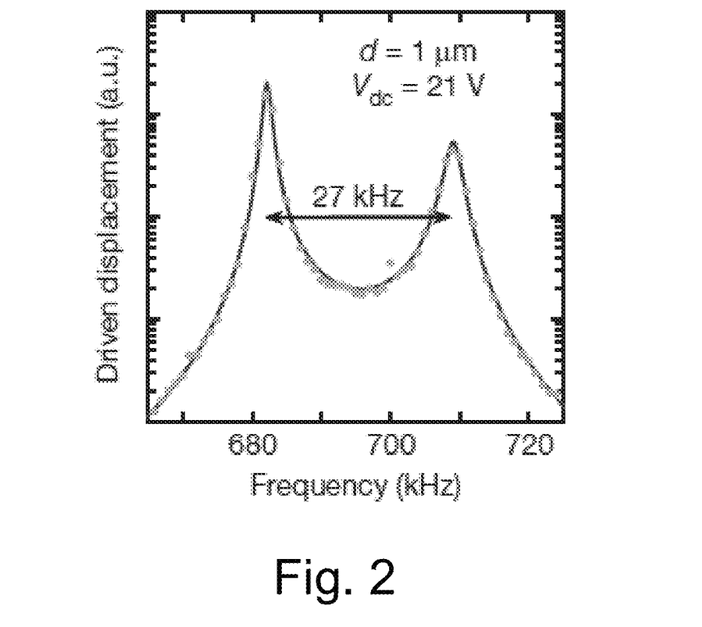
FIG. 2 shows the optically observed response of the displacement (arbitrary units) of the membrane to a weak excitation of the system (frequency in the ~1 MHz-range) and reveals a split peak due to strong electromechanical coupling.

Much richer dynamics than this shift may be expected from the mutually coupled system described by equation (3). For small excursions, (δq, δx), around the equilibrium, ($\bar{q}$, $\bar{x}$), it can be described by the linearized interaction term:

$$H_1 = G\delta q \delta x = \hbar g_{em} \frac{\delta q}{\sqrt{\hbar/2L\Omega_{LC}}} \frac{\delta x}{\sqrt{\hbar/2m\Omega_m}} \tag{5}$$

parameterized by either the coupling parameter $G=-V_{dc}C'(\bar{x})/C(\bar{x})$ or the electromechanical coupling energy, $\hbar g_{em}$, where $\hbar$ is Planck's constant, h, divided by $2\pi$. This coupling leads to an exchange of energy between the electronic and mechanical subsystems at the rate $g_{em}$. If this rate exceeds the dissipation rates of the electronic and mechanical subsystems, $\Gamma_{LC}=\Omega_{LC}/Q_{LC}$ and $\Gamma_m=\Omega_m/Q_m$, respectively, they hybridize into a strongly coupled electromechanical system. The system according to the invention is deeply in the strong coupling regime ($2g_{em}=2\pi 27$ kHz$>\Gamma_{LC}=2\pi*5.5$ kHz$>>\Gamma_m=2\pi*20$ Hz) for a distance d=1 µm and a bias voltage $V_{dc}$=21 V (see FIG. 2). Here we detect the strong coupling using an independent optical probe (i.e. light source and photodetector) on the mechanical system.

A series of experiments were performed in which the bias voltage is systematically increased with a different sample, a larger distance, d=5.5 µm, and a lower mechanical dissipation, $\Gamma_m/2\pi$=2.3 Hz. The system was excited inductively through the coupling port 31 (cf. FIG. 1A), inducing a weak radio-frequency signal with a root mean squared amplitude $V_s$=670 nV, at a frequency $\Omega \approx \Omega_{LC}$. The response of the coupled system may be measured both electrically, as the voltage across the capacitors 4 and 8 (using the coupling port 81 shown on FIG. 1A), and optically, by analyzing the phase shift of a light beam (in this example with a wavelength, λ, of 633 nm) reflected from the membrane 41. Both signals are recorded with a lock-in amplifier, which also provides the excitation signal.

Figure 3:
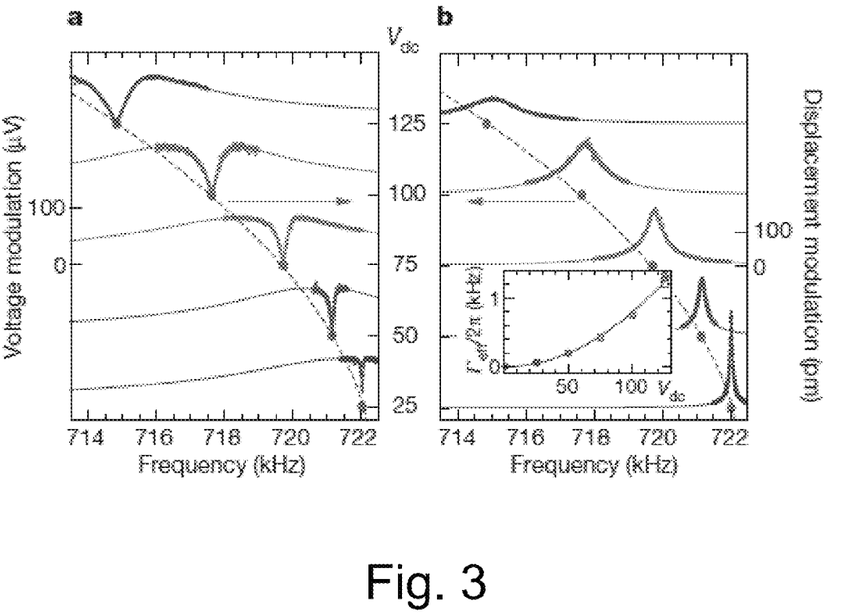

The electrically measured response shown in FIG. 3, graph a, shows the signature of a mechanically induced transparency, indicated by the dip in the LC resonance curve. Independently, the radio-frequency signal in the LC circuit was observed optically via the membrane mechanical dynamics as shown in FIG. 3, graph b. In particular, the electromechanical coupling leads to a broadening of the mechanical resonance to a new effective linewidth, $\Gamma_{eff}=(1+C_{em})\Gamma_m$, where $C_{em}$ is the electromechanical cooperativity:

$$C_{em} = \frac{4g_{em}^2}{\Gamma_m \Gamma_{LC}} \tag{6}$$

The width of the induced transparency dip and the mechanical linewidth grow in unison, and in agreement with the expectations, as $\Gamma_{eff} \propto V_{dc}^2$ as shown in FIG. 3, graph b, inset. Both of these features also shift to lower frequencies as the bias voltage is increased, following the expected dependence, $\Delta\Omega_m \propto V_{dc}^2$. It is noted that in each experiment the LC resonance frequency was tuned to $\Omega_m$.

Using the model based on the full Langevin equations derived from the Hamiltonian in equation (3), the electronically and optically measured curves were fit, and for the two curves fit parameters $\Omega_m$, $\Omega_{LC}$, $\Gamma_{LC}$ and G that agree typically to within 1% were obtained. Together with the intrinsic damping determined independently from thermally driven spectra, the system's dynamics can be quantitatively predicted. The data analysis allows to quantify the coupling strength in three independent ways: analysis of the spectral shape of the mechanical responses, comparison of the voltage and displacement modulation amplitudes, and in terms of the frequency shift of the mechanical mode. Finally, these experimental values were compared with a theoretical estimate accounting for the geometry of the electromechanical transducer. For $V_{dc}$=125 V, it was found that G=10.3 kVm$^{-1}$ following the first method, and similar values were found using the three other methods, thus demonstrating excellent agreement between theory and observations.

Figure 4:
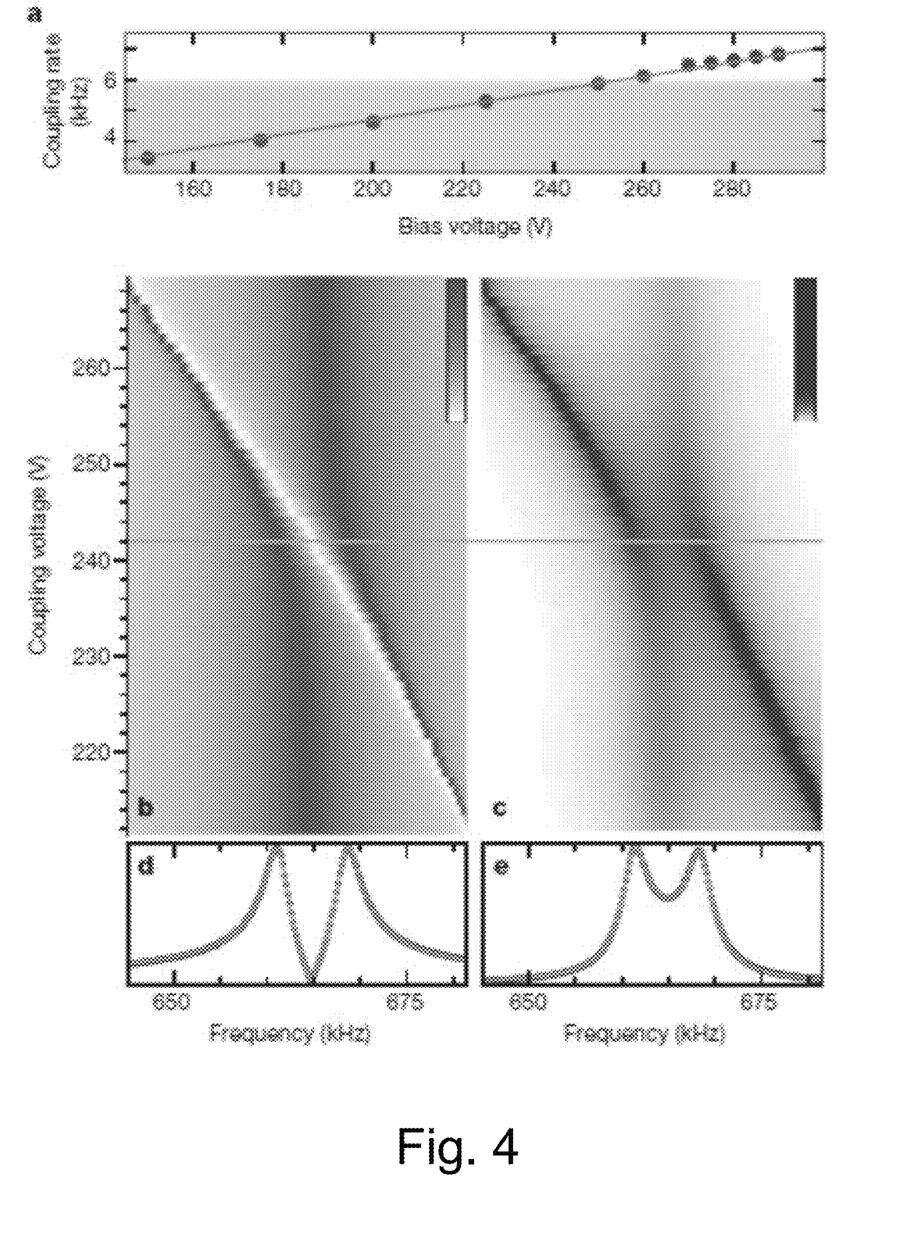

In another experimental run with d=4.5 μm and illustrated in FIG. 4, the strong electromechanical coupling was characterized by using the normal-mode splitting that gives rise to an avoided crossing of the resonances of the electronic circuit and the mechanical mode, as the latter is tuned through the former using the capacitive spring effect. Here, the strong coupling through the optical readout, in which the recorded light phase reproduces the membrane motion (cf. FIG. 4, graphs c and e), is witnessed simultaneously. Again, the predictions derived from the Langevin equations are in excellent agreement with the observations, yielding a cooperativity of $C_{em}$=3,800 for these data with m=24 ng and $\Gamma_m/2\pi$=3.1 Hz.

Turning now to the performance of the membrane interface as a radiofrequency/optical transducer, a relevant figure of merit for the purpose of bringing small signals onto an optical carrier is the voltage, $V_\pi$, required at the input of the series circuit to induce an optical phase shift of π. Achieving minimal $V_\pi$ requires a balance between strong coupling and induced mechanical damping. For the optimal cooperativity, $C_{em}$=1, it may be found that $$V_\pi = \frac{1}{2}\sqrt{mL\Gamma_m\Gamma_{LC}}\,\lambda\Omega_r \approx 140\ \mu V \tag{7}$$

At resonance (with the resonance frequency $\Omega r \equiv \Omega_m = \Omega_{LC} = \Omega$), which is orders of magnitude below the corresponding figure of merit for not only commercial modulators optimized for decades by the telecom industry, but also explorative microwave photonic devices based on electronic nonlinearities. It is interesting to relate this performance to more fundamental entities, namely the electromagnetic field quanta that constitute the signal. Indeed it is possible to show that the quantum conversion efficiency, defined here as the ratio of optical sideband photons to the radio-frequency quanta extracted from the source, $V_s I/\hbar\Omega_{LC}$, for $C_{em} \gg 1$, is given by $$\eta_{eo} = 4(kx_{zpf})^2 \frac{\Phi_{car}}{\Gamma_m} \tag{8}$$

This corresponds to the squared effective Lamb-Dicke parameter, $(kx_{zpf})^2 = (2\pi/\lambda)^2\,\hbar/2m\Omega_m$ enhanced by the number of photons sampling the membrane during the membrane excitations' lifetime ($\phi_{car}$ is the photon flux and k is the wavenumber). For the experiments shown in FIG. 3, a conversion efficiency of 0.8% was deduced from the independently measured radiofrequency voltage and optical phase modulation. Although this result is limited by the optical power in this interferometer, tests were performed to confirm that the membranes can support optical readout powers of more than $\phi_{car}$ hc/λ=20 mW without degradation of their (intrinsic) linewidth. It is thus projected that conversion efficiencies of the order of 50% are available. Note that this transducer constitutes a phase-insensitive amplifier, and can thus reach conversion efficiencies greater than one, albeit at the expense of added quantum noise.

For the recovery of weak signals, the sensitivity and bandwidth of the interface is of greatest interest. The signal at the optical output of the device is the interferometrically measured spectral density of the optical phase, $\phi$, of the light reflected from the membrane:

$$S_{\phi\phi}^{tot} = (2k)^2 |\Omega_m^{eff}|^2(|G\chi_{LC}|^2 S_{VV} + S_{FF}^{th}) + S_{\phi\phi}^{im} \tag{9}$$

Figure 5:
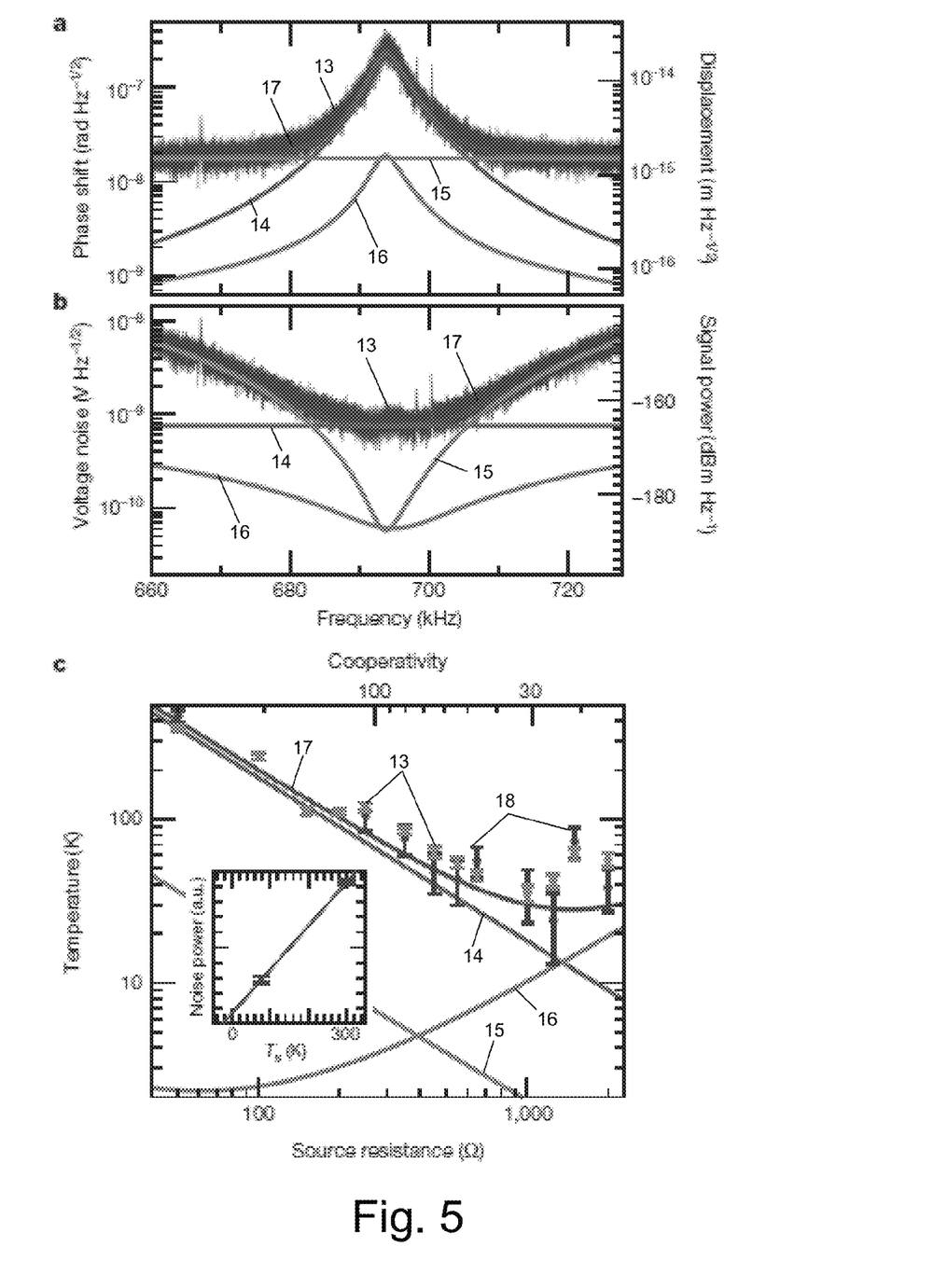

The voltage $V_s$ at the input of the resonance circuit (denoted here as its spectral density $S_{VV}$) is transduced to a phase shift via the circuit's susceptibility, $\chi_{LC}$, the coupling, G, the effective membrane susceptibility, $\chi_m^{eff}$, and the optical wavenumber, k. The sensitivity is determined by the noise added within the interface. This includes, in particular, the imprecision in the phase measurement ($S_{\phi\phi}^{im}$) and the random thermal motion of the membrane induced by the Langevin force ($S_{FF}^{th}$). The former depends on the performance of the interferometric detector used and can be quantum limited ($S_{\phi\phi}^{im} \propto \Phi_{car}^{-1}$). The sensitivity and the noise performance of the transduction scheme were demonstrated by measuring the noise as a function of the input circuit resistor and its temperature (FIG. 5). Because the home-made, high-Q inductor turned out to be too sensitive to the ambient radio-frequency radiation, a shielded commercial inductor was used resulting in a lower value, $Q_{LC}$=47, for these measurements. Traces denoted 13 in FIG. 5, graphs a and b respectively, present the optically measured noise spectrum and the corresponding voltage noise. On resonance, the dominant contribution is the Johnson noise ($S_{VV}^1 \approx (800\ pV)^2\ Hz^{-1}$) of the circuit, denoted 14 in FIG. 5. Off resonance, optical quantum (shot) noise, denoted 15 in FIG. 5, limits the phase sensitivity to $S_{\phi\phi}^{im}$=(18 nrad)$^2$ Hz$^{-1}$, corresponding to membrane displacements of (1.5 fm)$^2$ Hz$^{-1}$. In this experiment, a home-built interferometer operating at λ=1,064 nm and with a light power of ~1 mW returned from a membrane with m=64 ng and $\Gamma_m/2\pi$=20 Hz was used. The square root of the phase sensitivity can be translated into a voltage sensitivity limit by division by the transfer function, $|\chi^{tot}| \equiv 2k\chi_m^{eff} G\chi_{LC}|$ of the transducer. With the cooperativity chosen here, $C_{em}$=150, this corresponds to a voltage noise level of 60 pV Hz$^{-1/2}$ within the resonant bandwidth of this proof-of-principle transducer, but higher powers, and more sensitive optomechanical transduction could readily improve this number. From the model used, it was furthermore deduced that the contribution of the thermal motion of the membrane adds an equal amount of voltage noise (denoted 16 on FIG. 5), such that, at this cooperativity, these noise contributions are balanced and their sum minimized to 84 pV Hz$^{-1/2}$.

Further analysis of the transducer noise has been performed by measurements with an additional, 'source', resistor, $R_s$, in series with the inductor of the circuit, cf. FIG. 5, graph c). The input to this circuit thus consists of the Johnson noise of both resistors, $(S_{VV}{}^J){}'=2k_B(RT_R+R_sT_s)$. The source resistor $R_s$ was cooled using liquid nitrogen, and the displacement of the membrane both at room temperature ($T_s=300$ K) and at liquid nitrogen temperature ($T_s=77$ K) was optically measured. The amount of noise added by the transducer can thus be determined using the Y-factor method. From equation (9), we expect to find a noise temperature of $$T_n = \left(\frac{1}{\eta_e} - 1\right)T_R + \frac{1}{\eta_e}\left(\frac{1}{C_{em}}T_m + \frac{(1+C_{em})^2}{C_{em}}T_L\right) \tag{10}$$

at resonance, where the three summands are due to the Johnson noise of the circuit's loss, R=60 Ω, at $T_R$=300 K, the membrane's thermal fluctuations ($T_m$=300 K) and the noise in the optical readout ($T_L$≈50 mK), respectively. It is noted that both the circuit's loading, $\eta=R_s/(R_s+R)$, and the cooperativity, $C_{em}=RC_{em}(R_s=0\Omega)/(R_s+R)$ are now functions of the source resistance. In this experiment, the cooperativity was varied by varying the source resistor from $C_{em}$ ($R_s=0\Omega$)=550 to $C_{em}$ ($R_s=2$ kΩ)=18, and find a noise temperature consistent overall with equation (10), with the lowest measured value reaching down to 24 K (cf. FIG. 5, graph c). The challenge of engineering a low-loss, overcoupled electronic resonance circuit ($\eta_e \to 1$) aside, the transducer itself adds only very little noise (the lines denoted 15 and 16 in FIG. 5, graph c, representing the second and third terms in equation (10), respectively). For example, at a cooperativity of $C_{em}$=70 achieved with $R_s$=400Ω, subtracting the Johnson noise from the total noise yields optical quantum phase noise and membrane thermal noise temperatures of 4 K. Remarkably, the membrane contribution, which can usually only be suppressed by cryogenic cooling, is strongly reduced by the cooperativity parameter ($\propto T_m/C_{em}$). The highest cooperativity obtained was $C_{em}$=6,800, by applying equation (6) to the data of FIG. 2. This implies that membrane noise temperatures down to 40 mK can be expected, corresponding here to a voltage noise level of 5 pV Hz$^{-1/2}$. For comparison, measurements were performed with an arrangement of ultralow-noise operational amplifiers connected directly to the coupling port 81. The amplifier is based on junction field-effect transistors (JFETs) and combines low input voltage noise (nominally 4 nV Hz$^{-1/2}$) with extremely low current noise (nominally 2.5 fA Hz$^{-1/2}$), as required for measurements on a relatively high source impedance, which here amounts to $RQ_{LC}^2 \approx 140$ kΩ at coupling port 81. In practice, with a gain of 1,000, the best voltage sensitivity obtained was only $S_{VV}{}^{aa,tot}(\Omega_{LC})=(130$ pV$)^2$ Hz$^{-1}$ over the bandwidth of the LC resonance. Similar performance levels—on a par with the transducer discussed here—are expected even for ideal operation of other amplifiers described in the scientific and technical literature.

Apart from being competitive with standard electronics in its noise figures, the device according to the invention provides a new functionality owing to its direct compatibility with fibre optical communication lines. The presented optical detector for detecting RF signals also compares very favorably with previous proof-of-principle mechanical amplifiers for radio-frequency detection and microwave radiation detection. Because the noise floor of the device according to the invention is well below the room temperature Johnson noise from the circuit's loss, R=60Ω, this approach can be of particular relevance in applications where electronic Johnson noise is suppressed. For example, for direct electronic (quantum) signal transduction, the resonance circuit is overloaded ($\eta_e \to 1$) with a cold transmission line that carries the signal of interest, but no Johnson noise.

In radio astronomy, highly efficient antennas looking at the cold sky can have noise temperatures far below room temperature. The usually required cryogenically cooled pre-amplifiers may be replaced by the detector for detecting RF signals according to the invention, posing a critical advantage for satellite missions, and extension to gigahertz frequencies is straightforward if using an AC voltage source 6. Direct and efficient conversion of radiofrequency signals into optics could save substantial resources in large phased-array antennas. Finally, in NMR experiments including imaging, cooled pickup circuits can deliver a significant sensitivity improvement, but this approach challenges present amplifier technology.

The position dependent capacitor 4 of the device 1 according to the invention and shown in FIGS. 1A to 1C may be fabricated by standard cleanroom microfabrication techniques. In one non-limiting example electrodes 44 made of gold (for instance 200 nm thick) are deposited on a glass substrate 45 and structured by ion-beam etching. Each segment is for instance 400 μm long, with 60-μm gaps between the segments. Pillars (not shown), which may range in height from 600 nm to 1 μm, are placed to define the membrane-electrode distance. The inductor 3 is wound with Litz wires to ensure a high Q-factor. A variable trimming capacitor 8 is used to tune the resonance frequency of the LC circuit 2. The mechanical resonator, or membrane 41, consists of a 50-nm-thick aluminum layer on top of a high-stress stoichiometric SiN layer with a thickness of 100 nm or 180 nm depending on the sample. The aluminum layer is deposited on top of the whole wafer after the membranes have been released. Photolithography and chemical etching are subsequently used to remove the metal from the anchoring regions and, optionally, from a circle (opening 47 in FIG. 7) in the middle of the membrane 41. The metal layer on SiN typically causes a 10% decrease in the eigenfrequency of the fundamental mode. Optical interferometry is carried out using a commercial Doppler vibrometer (MSA-500 Polytec) and a home-made Michelson interferometer (for the data set shown in FIG. 5). The home-made Michelson interferometer uses shot-noise-limited, balanced-homodyne detection with a high-bandwidth (0-75 MHz) InGaAs receiver. The two DC outputs from the detector are used to generate the differential error signal, which is then fed to the piezoelectric actuator in the reference arm for locking the interferometer. The radio-frequency output of the detector is high-pass-filtered and fed to a spectrum analyzer to record the vibrations of the membrane 41. Absolute calibration of the mechanical amplitude is carried out through a known modulation of the piezoelectric actuator at a frequency close to the mechanical peak.

It should be noted that the above description of preferred embodiments serves only as examples, and that a person skilled in the art will know that numerous variations are possible without deviating from the scope of the claims.

The person skilled in the art realizes that the present invention by no means is limited to the preferred embodiments described above. On the contrary, many modifications and variations are possible within the scope of the appended claims.

The invention claimed is:

1. An optical detector and amplifier for detecting radio frequency (RF) and microwave signals, the optical detector comprising:

a light source and a photodetector, an electrical circuit comprising a position dependent capacitor, and a bias voltage source adapted for providing a bias voltage for biasing the position dependent capacitor, wherein the position dependent capacitor comprises an electrode and a membrane, the membrane being adapted for being displaced in reaction to RF signals incident on the membrane, the light source is adapted for, in operation, emitting light onto the membrane and the photodetector is adapted for, in operation, receiving light emitted by the light source and reflected by the membrane, the membrane is metallized, comprises a thickness of less than 1 µm, and comprises a quality factor, $Q_m$, of at least 20,000, and the distance, d, between the membrane and the electrode is less than 10 µm.

2. An optical detector and amplifier for detecting radio frequency (RF) and microwave signals according to claim 1, wherein the distance, d, between the membrane and the electrode is less than 5 µm, less than 3 µm or less than 1 µm.

3. An optical detector and amplifier for detecting radio frequency (RF) and microwave signals according to claim 1, wherein the membrane comprises a thickness of less than 500 nm, less than 100 nm or less than 50 nm.

4. An optical detector and amplifier for detecting radio frequency (RF) and microwave signals according to claim 1, wherein the membrane comprises a quality factor, $Q_m$, of at least 20,000, at least 100,000 or at least 300,000.

5. An optical detector and amplifier for detecting radio frequency (RF) and microwave signals according to claim 1, wherein the electric circuit further comprises a tuning capacitor connected in parallel with the position dependent capacitor and adapted for tuning the capacitance of the position dependent capacitor.

6. An optical detector and amplifier for detecting radio frequency (RF) and microwave signals according to claim 1, wherein the bias voltage source is a DC voltage source.

7. An optical detector and amplifier for detecting radio frequency (RF) and microwave signals according to claim 6, wherein the bias voltage source is a DC voltage source and the membrane is adapted for comprising a membrane frequency, $\Omega_m$, being less than 50 MHz.

8. An optical detector and amplifier for detecting radio frequency (RF) and microwave signals according to claim 1, wherein the bias voltage source is an AC voltage source adapted for providing an AC voltage oscillating at a frequency of between 1 MHz and 3 GHz, between 10 kHz and 5 GHz or between 10 Hz and 10 GHz.

9. An optical detector and amplifier for detecting radio frequency (RF) and microwave signals according to claim 1, wherein the electrical circuit further comprises an inductor.

10. An optical detector and amplifier for detecting radio frequency (RF) and microwave signals according to claim 1, wherein the electrode comprises a plurality of segments and/or is made of gold.

11. An optical detector and amplifier for detecting radio frequency (RF) and microwave signals according to claim 1, wherein the membrane is metallized in that it comprises a metallic coating extending over at least a part of its surface and/or in that it comprises a doped semiconductor.

12. An optical detector and amplifier for detecting radio frequency (RF) and microwave signals according to claim 11, wherein the metallic coating is an aluminum-coating.

13. An optical detector and amplifier for detecting radio frequency (RF) and microwave signals according to claim 1 and further comprising an optical resonator comprising a first reflector and a second reflector arranged on opposite sides of the position dependent capacitor.

14. An optical detector and amplifier for detecting radio frequency (RF) and microwave signals according to claim 1, wherein the bias voltage source is operated to provide a bias voltage of less than 100 mV, less than 1 V or less than 100 V.

15. A position dependent capacitor for an optical detector and amplifier for detecting radio frequency (RF) and microwave signals, wherein the position dependent capacitor comprising an electrode and a membrane, the membrane being adapted for being displaced in reaction to a RF signal or microwave signal applied to the membrane, the membrane is metallized, comprises a thickness of less than 1 µm, and comprises a quality factor, $Q_m$, of at least 20,000, and the distance, d, between the membrane and the electrode is less than 10 µm.

16. A position dependent capacitor according to claim 15, wherein the distance, d, between the membrane and the electrode is less than 9 µm, less than 7 µm or less than 5 µm.

17. A position dependent capacitor according to claim 15, wherein the membrane comprises a thickness of less than 900 nm, less than 700 nm or less than 500 nm.

18. A position dependent capacitor according to claim 15, wherein the membrane comprises a quality factor, $Q_m$, of at least 20,000, at least 100,000 or at least 300,000.

19. A position dependent capacitor according to claim 15, wherein the electrode comprises a plurality of segments and/or is made of gold.

20. A position dependent capacitor according to claim 15, wherein the membrane is metallized in that it comprises a metallic coating extending over at least a part of its surface and/or in that it comprises a metallic coating in the form of an aluminum-coating and/or in that it comprises a doped semiconductor.

* * * * *